US009194419B2

(12) United States Patent  (10) Patent No.: US 9,194,419 B2
Martin  (45) Date of Patent: Nov. 24, 2015

(54) INSERT KIT AND INSTALLATION METHOD

(75) Inventor: Paul Martin, Aldridge (GB)

(73) Assignee: PSM IP LIMITED (VG)

( * ) Notice: Subject to any disclaimer, the term of this patent is extended or adjusted under 35 U.S.C. 154(b) by 698 days.

(21) Appl. No.: 12/991,979

(22) PCT Filed: May 12, 2009

(86) PCT No.: PCT/GB2009/001166
§ 371 (c)(1),
(2), (4) Date: Nov. 10, 2010

(87) PCT Pub. No.: WO2009/138719
PCT Pub. Date: Nov. 19, 2009

(65) Prior Publication Data
US 2011/0070047 A1  Mar. 24, 2011

(30) Foreign Application Priority Data

May 16, 2008 (GB) .................................. 0809001.1

(51) Int. Cl.
*F16B 37/12* (2006.01)
(52) U.S. Cl.
CPC ......... *F16B 37/122* (2013.01); *Y10T 29/49826* (2015.01)
(58) Field of Classification Search
USPC ........... 411/81, 103, 104, 111, 172, 176–178, 411/180, 997; 403/280, 292, 294, 298; 29/428
See application file for complete search history.

(56) References Cited

U.S. PATENT DOCUMENTS

| 1,333,880 | A | * | 3/1920 | Stine | 52/707 |
| 3,074,292 | A | * | 1/1963 | Polmon | 74/553 |
| 3,198,231 | A | * | 8/1965 | Bisbing | 411/109 |
| 3,204,679 | A | * | 9/1965 | Walsh | 411/180 |
| 3,498,353 | A | * | 3/1970 | Barry | 411/180 |
| D221,376 | S | * | 8/1971 | Tildesley | D8/385 |
| 3,727,254 | A | * | 4/1973 | Tildesley | 470/21 |
| 3,740,083 | A | * | 6/1973 | Zenhausern | 403/243 |
| 3,767,233 | A | * | 10/1973 | Hodge | 285/239 |
| 3,883,258 | A | * | 5/1975 | Hewson | 403/298 |
| 3,966,339 | A | * | 6/1976 | Nemecek et al. | 403/292 |
| D262,863 | S | * | 2/1982 | Barnsdale | D8/385 |
| 4,681,477 | A | * | 7/1987 | Fischer | 403/298 |
| D298,605 | S | * | 11/1988 | Colgan et al. | D8/382 |
| 4,842,462 | A | * | 6/1989 | Tildesley | 411/180 |
| 4,941,788 | A | * | 7/1990 | Highfield | 411/178 |

(Continued)

FOREIGN PATENT DOCUMENTS

DE  1704771 A1  2/1971
EP  0527627 A1  2/1993

OTHER PUBLICATIONS

International Searching Authority (ISA/EPO), International Search Report (Declaration of Non-Establishment of ISR) and Written Opinion of the ISA, for PCT/GB2009/001166, Mailing Date Sep. 29, 2009, 10 pages.

*Primary Examiner* — Flemming Saether
(74) *Attorney, Agent, or Firm* — Ostrolenk Faber LLP

(57) ABSTRACT

An insert (100) having a first insert portion (102) a second insert portion (104) and a third insert portion (106) for installation into a first bore portion (136), a second bore portion (138) and a third bore portion (140) respectively in which the first bore portion (136) is larger than the second and third insert portions (104, 106) and the second bore portion (138) is larger than the third insert portion (106).

11 Claims, 3 Drawing Sheets

(56) References Cited

U.S. PATENT DOCUMENTS

Figure 2:
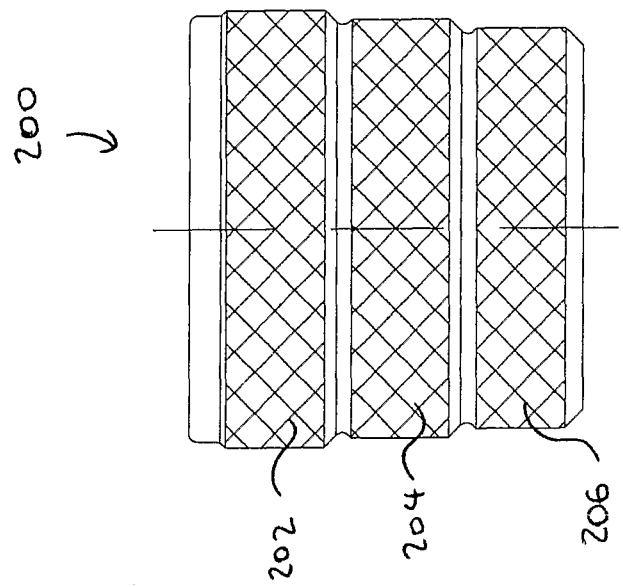

| | | | |
|---|---|---|---|
| D323,287 S * | 1/1992 | Brunetti | D8/385 |
| D323,288 S * | 1/1992 | Brunetti | D8/385 |
| 5,131,795 A * | 7/1992 | Kobusch | 411/178 |
| 5,232,302 A * | 8/1993 | Wagner et al. | 403/298 |
| 5,266,258 A * | 11/1993 | Martin | 264/249 |
| RE34,928 E * | 5/1995 | Highfield | 411/178 |
| 5,455,986 A | 10/1995 | Gentile | |
| 5,839,847 A * | 11/1998 | Patel | 403/269 |
| 6,267,527 B1 * | 7/2001 | Miller | 403/292 |
| 6,474,918 B1 * | 11/2002 | Kelch | 411/180 |
| 6,517,761 B2 * | 2/2003 | Yoshida et al. | 264/274 |
| 6,558,096 B2 * | 5/2003 | Kelch | 411/180 |
| 6,692,207 B1 * | 2/2004 | Bailey | 411/180 |
| 6,871,681 B2 * | 3/2005 | Miller | 144/347 |
| 6,898,822 B2 * | 5/2005 | Nordquist et al. | 16/2.1 |
| 6,953,300 B2 * | 10/2005 | Chen | 403/292 |
| 2002/0197129 A1 * | 12/2002 | Kelch | 411/180 |
| 2004/0037666 A1 * | 2/2004 | Kelch | 411/180 |
| 2011/0070047 A1 * | 3/2011 | Martin | 411/178 |
| 2011/0116889 A1 * | 5/2011 | Lin et al. | 411/103 |

\* cited by examiner

INSERT KIT AND INSTALLATION METHOD

CROSS-REFERENCE TO RELATED APPLICATIONS

This application is a U.S. national stage application of PCT application PCT/GB2009/001166, filed May 12, 2009, and claims the benefit of priority from British patent application GB 0809001.1, filed May 16, 2008.

BACKGROUND OF THE INVENTION

1. Field of the Invention

The present invention relates to an insert. More specifically, the present invention relates to inserts for installation into components made from plastics materials.

2. Description of the Related Art

Metal inserts are commonly used for the attachment of components constructed from plastics materials. Plastics materials are not particularly well suited to the formation of mechanical joining features such as threads as they have relatively low stiffness and strength compared to metals. As such, it is common practice to permanently install metal inserts into plastic components to provide mechanical joining features. These metal inserts have internal mechanical joining features such as threads.

Inserts are commonly cylindrical in form and comprise features on their external surface to inhibit movement between the insert and the plastic component (anti-movement features). These may be circumferential features to provide pull-out resistance or axial features for torque resistance. Such features may have both circumferential and axial parts, such as knurls.

Metal inserts of the type described above are used in many applications such as vehicle assembly—e.g. interior trim.

Such metal inserts are commonly installed into the plastic components by locally heating the insert and/or the plastics material and forcing the insert into the component. The semi-fluid plastics material then flows around locking features of the insert and cools to provide a permanent mechanical bond between the component and the insert. Another known method is to vibrate the insert at a high frequency to create frictional heating at the insert-plastic boundary. This heating causes the plastics material to melt and flow around the insert external features before cooling and solidifying to form a bond.

Heat is applied to the insert prior to installation to heat the insert to a temperature above the softening point temperature of the plastics material. As the insert is installed, the plastic material draws heat from the insert and softens to flow around the insert external profile. The amount of energy required to complete the installation is therefore influenced by the time taken to complete the installation process. The time taken to install the insert is controlled by the insert design and the distance the insert travels during the insertion process.

A problem with such installation techniques is that the distance the insert must travel is generally equal to the length of the insert, and as such a significant amount of energy needs to be used to heat the insert in order to install it. Much of the insert is not contacting the plastics material during installation and as such the heat may be dissipated to the surrounding environment.

Alternatively, ultrasonic energy may be used to heat the insert and surrounding plastics material during installation. Therefore ultrasonic energy must be supplied during the entire installation. As such, as the entire insert must be vibrated for the entire time it takes to fully install the insert. This is not energy efficient as, particularly during the initial stages of installation, much of the length of the insert is not contacting the plastics material.

It is an aim of the present invention to overcome or at least mitigate the above problem.

BRIEF SUMMARY OF THE INVENTION

According to a first aspect of the invention there is provided an insert assembly kit comprising; a generally cylindrical stepped insert having; a first cylindrical insert portion of a first insert diameter, a second cylindrical insert portion of a second insert diameter, and a third cylindrical insert portion of a third insert diameter, in which the first insert diameter is greater than the second and third insert diameters, the second insert diameter is greater than the third insert diameter, and the second insert portion is positioned axially between the first and third insert portions, the insert assembly further comprising; a plastics part having a generally cylindrical stepped bore defining; a first cylindrical bore portion of a first bore diameter, a second cylindrical bore portion of a second bore diameter, and a third cylindrical bore portion of a third bore diameter, in which the first bore diameter is greater than the second and third bore diameters, the second bore diameter is greater than the third bore diameter, and the second bore portion is positioned axially between the first and third bore portions, wherein the first, second and third bore diameters are smaller than the first, second and third insert diameters respectively to engage and thereby retain the insert upon installation into the plastics part, and; wherein the first bore diameter is greater than second and third insert diameters, and the second bore diameter is greater than the third insert diameter such that the second and third insert portions are freely positionable within the first and second bore portions respectively.

Advantageously, the insert may be freely inserted into the bore before heating and/or vibration commences. To install the insert, energy only needs to be provided to the insert for a length of time necessary for the longest insert portion to be installed.

The fact that the first bore diameter is larger than both the first and second insert diameters assists in location of the insert within the bore, and alignment of the two components. As such, a less precise tolerance can be used to produce i) moulded hole centres in the host plastic component and ii) implement insert positioning relative to the moulded hole during insertion.

The first, second and third insert and/or bore portions may be substantially equal in axial length. As such, the amount of heat energy required to successfully install the insert is less as the first, second and third portions are simultaneously installed. Further, the amount of ultrasonic energy only needs to be supplied to the insert for a fraction (approximately one third) of the time taken to install a known insert, as the first, second, and third portions are installed simultaneously.

According to a second aspect of the invention there is provided a method of installation of an insert into a plastics component comprising the steps of: providing a generally cylindrical stepped insert having; a first cylindrical insert portion of a first insert diameter, a second cylindrical insert portion of a second insert diameter, and a third cylindrical insert portion of a third insert diameter, in which the first insert diameter is greater than the second and third insert diameters, the second insert diameter is greater than the third insert diameter, and the second insert portion is positioned axially between the first and third insert portions, providing a plastics part having a generally cylindrical stepped bore defining; a first cylindrical bore portion of a first bore diameter, a second cylindrical bore portion of a second bore diameter, and a third cylindrical bore portion of a third bore diameter, in which the first bore diameter is greater than the second and third bore diameters, the second bore diameter is greater than the third bore diameter, and the second bore portion is positioned axially between the first and third bore portions, wherein the first, second and third bore diameters are smaller than the first, second and third diameters respectively, and, in which the first bore diameter is greater than second and third insert diameters, and the second bore diameter is greater than the third insert diameter, freely positioning the second and third insert portions within the first and second bore portions respectively, and; installing the insert into the bore to engage the first, second and third insert portions with the first, second and third bore portions to thereby engage and retain the insert.

BRIEF DESCRIPTION OF THE SEVERAL
VIEWS OF THE DRAWINGS

Figure 1:
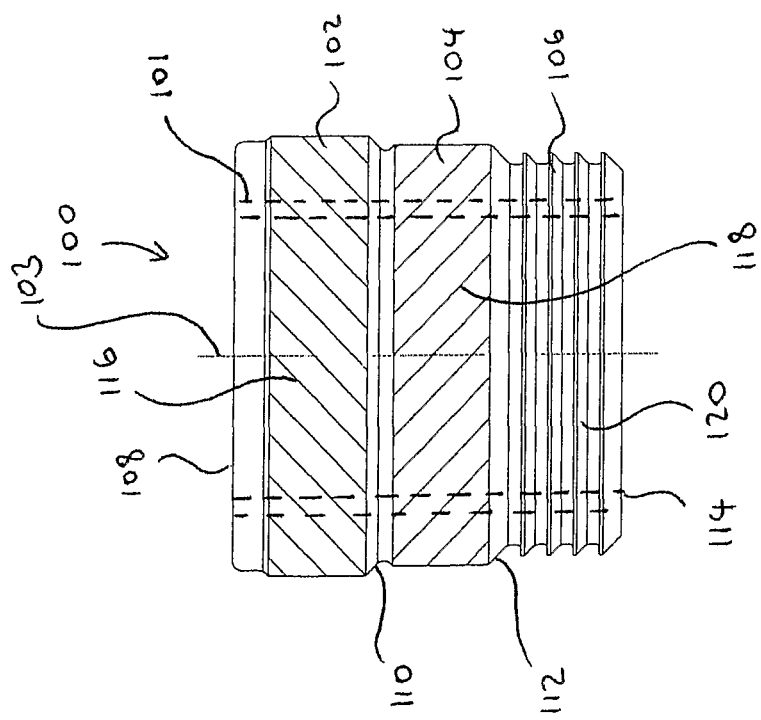
Figure 4:
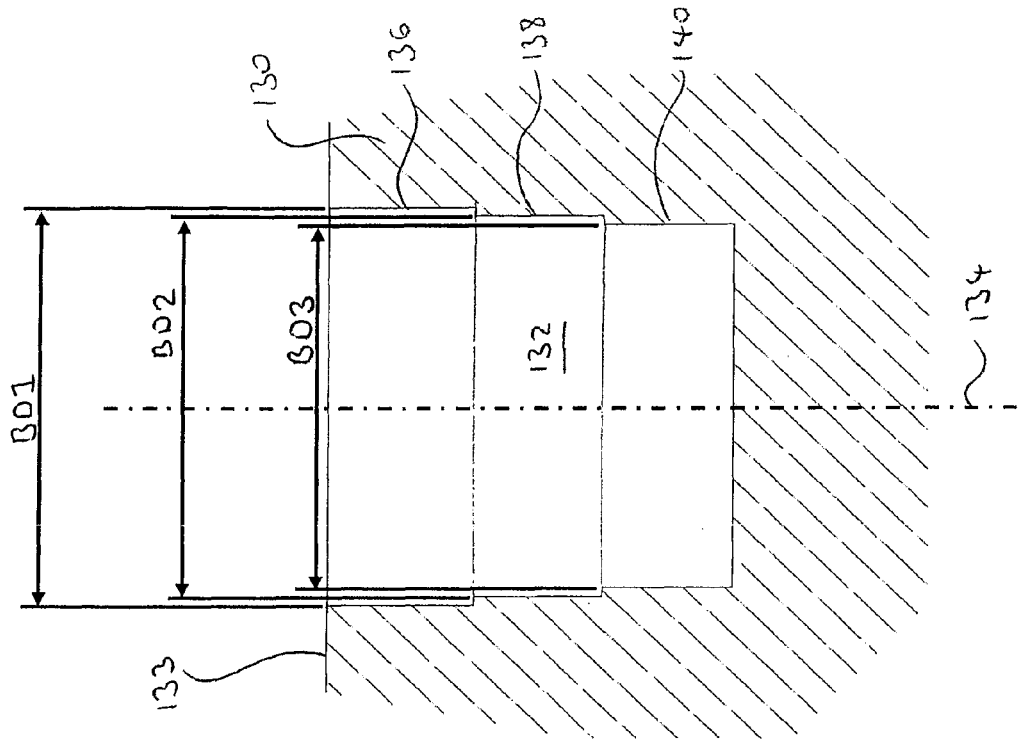
Figure 3:
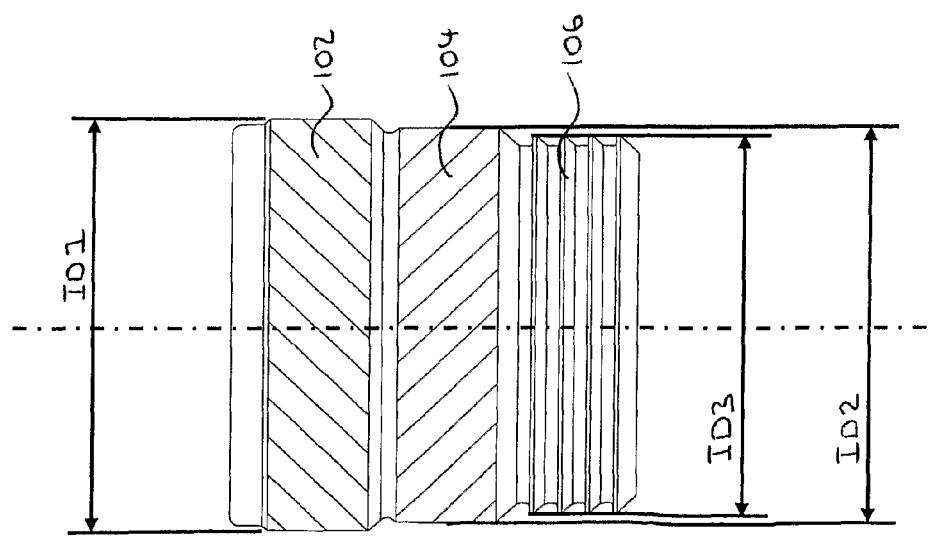
Figures 5, 6, 7:
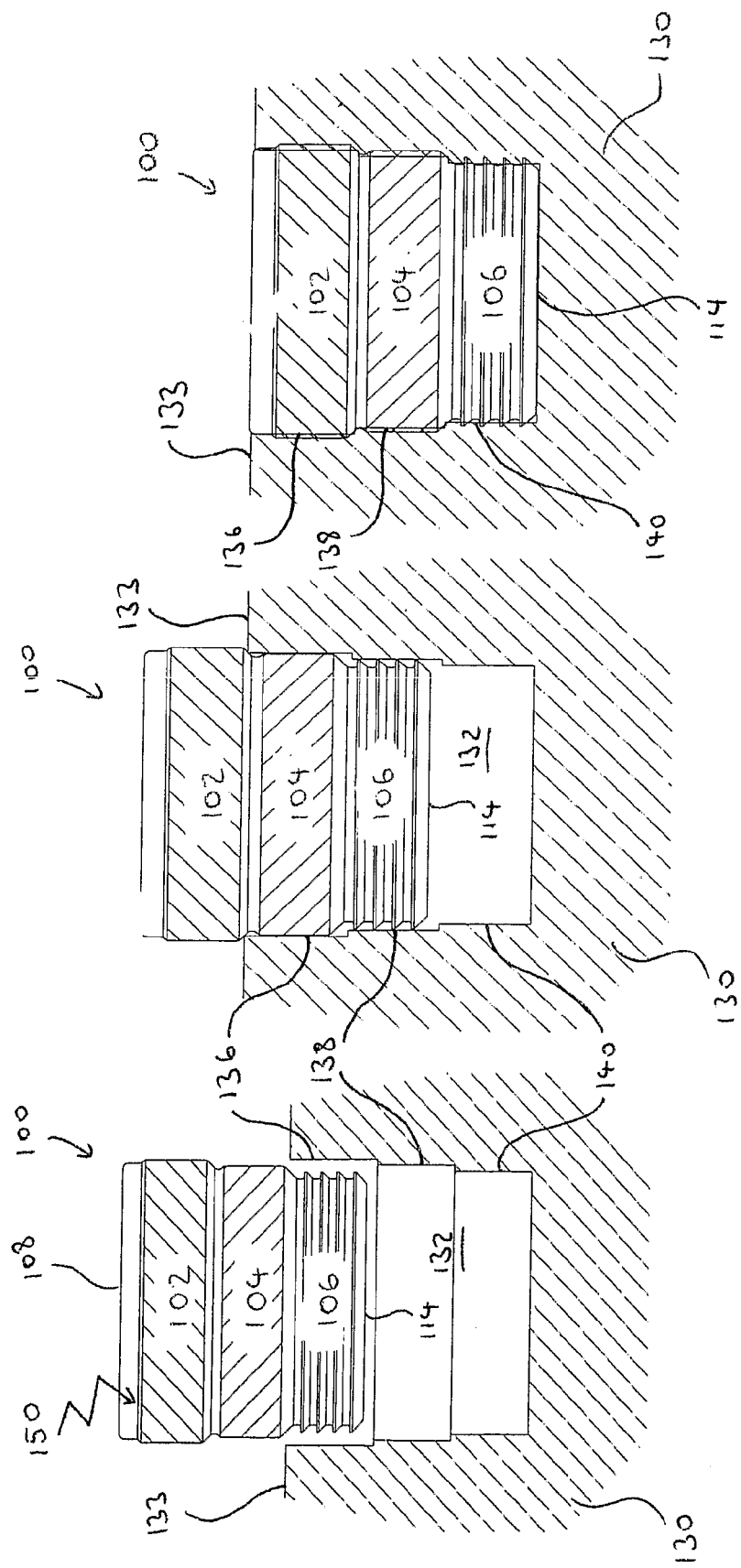

An example insert kit and installation method in accordance with the present invention will now be described with reference to the accompanying figures in which:

FIG. 1 is a side view of a first embodiment of an insert in accordance with the present invention, FIG. 2 is a side view of a second embodiment of an insert in accordance with the present invention, FIG. 3 is a side view of the insert of FIG. 1, FIG. 4 is a side section view of a part of a plastic component in accordance with the present invention, FIG. 5 is a partially sectioned side view of the insert of FIG. 3 at a first stage of engagement with the plastic component of FIG. 4, FIG. 6 is a view similar to FIG. 5 at a second stage of engagement, and;

FIG. 7 is a view similar to FIG. 5 at a third stage of engagement.

DETAILED DESCRIPTION

Referring to FIG. 1, and insert 100 has a generally cylindrical body about a main axis 103 comprising a first insert portion 102, a second insert portion 104 and a third insert portion 106 which are all generally cylindrical and of equal length of approximately one third of the total insert length. The insert 100 is hollow, and defines an open threaded bore 101. The insert 100 defines an entry area 108 for the mating of a male threaded member into the threaded bore. The first insert portion 102 is connected to the entry area 108, and to a neck 110 which connects it to the second insert portion 104. The second insert portion 104 is connected to a shoulder 112. The shoulder 112 connects to the third insert portion 106. The third insert portion 106 terminates in an end region 114.

The first insert portion 102 defines helical grooves 116 on its outer surface. The second insert portion 104 defines opposing helical grooves 118 on its outer surface. The third insert portion 106 defines annular ribs 120 on its outer surface.

Referring to FIG. 2, an insert 200 is substantially similar to the insert 100 but knurls are defined on each of the first, second and third insert portions 202, 204, 206.

Referring to FIG. 3, the insert 100 is shown with the diameters of the first, second and third insert portions 102, 104, 106 shown as ID1, ID2 and ID3 respectively.

Referring to FIG. 4, a component 130 is shown constructed from plastic material and defining a blind bore 132 extending from a surface 133. The blind bore 132 is generally cylindrical about a main axis 134 and comprises a first bore portion 136, a second bore portion 138 and a third bore portion 140.

The first bore portion 136 is proximate the surface 133 and the third bore portion is furthest from the surface 133. The diameters of the first, second and third bore portions 136, 138, 140 are BD1, BD2 and BD3 respectively.

It should be noted that:

BD1<ID1,

BD2<ID2,

BD3<ID3 to an extent that a bond between the component 130 and the insert 100 is formed upon installation, as will be described below;

BD1>ID2,

BD1>ID3 such that the second and third insert portions 104, 106 can be freely inserted into the first bore portion 136, and;

BD2>ID3 such that the third insert portion 106 can be freely inserted into the second bore portion 138.

Referring now to FIGS. 5 to 7 which show the installation process. FIG. 5 shows the insert 100 being guided into the bore 132. As can be seen the insert can be freely moved into the bore as the third insert portion 106 is substantially smaller than the first bore portion 136.

In order to install the insert 100 fully into the bore 132, the insert must be supplied with heat from a heat source 150 before installation (shown schematically). The heat source 150 heats the insert 100 to an installation temperature.

Moving onto FIG. 6, the insert 100 has now been freely inserted by two thirds of its axial length as the second insert portion 104 and the third insert portion 106 fit into the first bore portion 136 and the second bore portion 138 respectively. At this point, the insert 100 cannot travel any further into the bore 132 as the bore portions 136, 138 and 140 are smaller than their respective insert portions 102, 104, 106.

Consequently as the insert 100 is installed, the plastics material of the component 130 surrounding the insert 100 softens. The insert 100 is then installed into the bore 132 by a further length equal to one third of the length of the insert 100. As this occurs, the first, second and third insert portions 102, 104, 106 are installed simultaneously.

The installed insert is shown in FIG. 7. It should be noted that the opposing torque resistant helical grooves 116, 118 are located on the first and second insert portions 102, 104 respectively, thus advantageously providing torque resistance at a larger diameter than the third insert portion 106.

Variations of the above embodiment fall within the scope of the present invention.

The insert and bore may have more than three portions, thus further decreasing the installation depth. It should be noted that any less than three corresponding portions would not be sufficient to achieve the benefits of reduced installation distance and improved alignment. Three portions however is a practical optimum which results in the benefits described whilst not requiring an excessive number of machining operations to form the portions.

The insert may be ultrasonically vibrated instead of or as well as heated during installation.

The insert outer surface may be knurled, have ribs, or any combination thereof.

The portions do not have to be the same length, for example, the first and second portions may make up 70% of the total length of the portions and the third portion 30%.

The bore 132 may be a through bore.

What is claimed is:

1. An insert assembly kit comprising:
   a generally cylindrical stepped insert having:
      a first cylindrical insert portion of a first insert diameter and a first axial length and the first insert diameter extending over the first axial length, a second cylindrical insert portion of a second insert diameter and a second axial length and the second insert diameter extending over the second axial length, a third cylindrical insert portion of a third insert diameter and a third axial length and the third insert diameter extending over the third axial length, in which the first insert diameter is greater than the second and third insert diameters, the second insert diameter is greater than the third insert diameter, and the second insert portion is positioned axially between the first and third insert portions, the insert assembly kit further comprising:

a plastics part having a generally cylindrical stepped bore defining:

a first cylindrical bore portion of a first bore diameter and a first axial length approximately the first axial length of the first insert portion, a second cylindrical bore portion of a second bore diameter and a second axial length approximately the second axial length of the second insert portion, and a third cylindrical bore portion of a third bore diameter and a third axial length approximately the third axial length of the third insert portion, the stepped insert having a number of the cylindrical insert portions equal to a number of the cylindrical bore portions of the plastic part, wherein each of the first, second and third cylindrical insert portions is configured such that each of the insert portions is the only one of the insert portions respectively configured to be received in a respective one of the first, second and third bore portions, wherein the first bore diameter is greater than the second and third bore diameters, the second bore diameter is greater than the third bore diameter, and the second bore portion is positioned axially between the first and third bore portions, wherein the first, second and third bore portion diameters are smaller than the first, second and third insert portion diameters respectively, configuring the bore portions to engage and thereby retain the respective insert portions upon installation of the stepped insert into the plastics part and locating and centralizing the insert portions in the respective bore portions, each of the first, second and third insert portions includes a respective cylindrical periphery, and each of the cylindrical peripheries includes a respective movement resistant feature on the cylindrical periphery thereof, wherein a first one of the movement resistant features on a first one of the insert portion cylindrical peripheries comprises torque resistant features on the first one of the insert portion cylindrical peripheries, the first one of the insert portion cylindrical peripheries is shaped such that with the first one of the insert portions cylindrical peripheries engaging the respective bore portion for the first one of the insert portion cylindrical peripheries, the respective torque resistant features resist torque on the insert;

a second one of the movement resistant features on a second one of the insert portion cylindrical peripheries comprises pull out resistant features on the second one of the insert portion cylindrical peripheries, the second one of the insert portion cylindrical peripheries is shaped such that with the second one of the insert portion cylindrical peripheries engaging the respective bore portion for the second one of the insert portion cylindrical peripheries, the respective pull out resistant features resist pull out of the insert from the respective bore portion, and wherein the second one of the insert portion cylindrical peripheries with pull out resistant features has no torque resistant features;

wherein the first bore diameter is greater than second and third insert diameters, and the second bore diameter is greater than the third insert diameter such that the second and third insert portions are accurately located and centralized within the first and second bore portions respectively when the insert is initially installed in the bore, and prior to insertion of each insert portion into its respective bore portion which configuration accurately locates and centralizes the insert prior to the insertion of each insert portion into its respective bore portion.

2. An insert assembly kit according to claim 1 in which the first, second and third insert portions are of a substantially equal axial length.

3. An insert assembly kit according to claim 2 in which each of the first, second and third insert portions is approximately one third of the axial length of the stepped insert and each of the first, second and third bore portions is approximately one third of the axial length of the plastics part, and the first, second and third bore portions are of substantially equal axial length to the respective first, second and third insert portions.

4. An insert assembly kit according to claim 1 in which the stepped insert is configured to cause a threaded inner bore to be defined in the insert.

5. An insert assembly kit according to claim 1, wherein every one of the bore portions is configured to receive and engage the respective insert portion that is received therein when the insert assembly is assembled.

6. An insert assembly kit according to claim 1, wherein there are only three of the insert portions and only three of the respective bore portions.

7. An insert assembly kit according to claim 1, wherein a leading edge of at least one of the first, second, and third insert portions comprises a tapered surface.

8. An insert assembly kit according to claim 1, further comprising:

a third one of the insert portion cylindrical peripheries also comprises torque resistant features on the third one of the insert portion cylindrical peripheries, the third one of the insert portion cylindrical peripheries is also shaped such that with the third one of the insert portion cylindrical peripheries engaging the respective bore portion for the third one of the insert portion cylindrical peripheries, the respective torque resistant features on the first and the third ones of the insert portion cylindrical peripheries resist torque on the insert in opposite directions of torque.

9. An insert assembly kit according to claim 8, wherein the torque resistant features on the first one of the insert portion cylindrical peripheries comprise and are configured to be inclined in a first direction; and the torque resistant features on the third one of the insert portion cylindrical peripheries comprise and are configured to be inclined in another direction opposing the first direction; and the pull out resistant features without the torque resistant features are on the second one of the insert portion cylindrical peripheries.

10. An insert assembly kit according to claim 9, wherein the pull-out resistant features on the second one of the insert portion cylindrical peripheries comprise an annular rib, and there are no torque resistant features on the cylindrical periphery of the second one of the insert portions.

11. An insert assembly kit according to claim 10, wherein the torque resistant features comprise first helical grooves on the respective cylindrical periphery of the first one of the insert portion cylindrical peripheries which is without the annular ribs; and second helical grooves oriented in an opposing orientation from the first helical grooves on the respective cylindrical periphery of the third one of the insert portion cylindrical peripheries which is also without the annular ribs, wherein the first and second helical grooves are oriented in the opposing orientations so as to be resistant to torque applied in opposite directions.

* * * * *